April 25, 1939.  E. J. W. RAGSDALE ET AL  2,156,229
SLEEPING CAR
Filed April 10, 1937   3 Sheets-Sheet 1

INVENTORS
Earl J. W. Ragsdale and
Joseph F. Clary
BY
John P. Barnes
ATTORNEY.

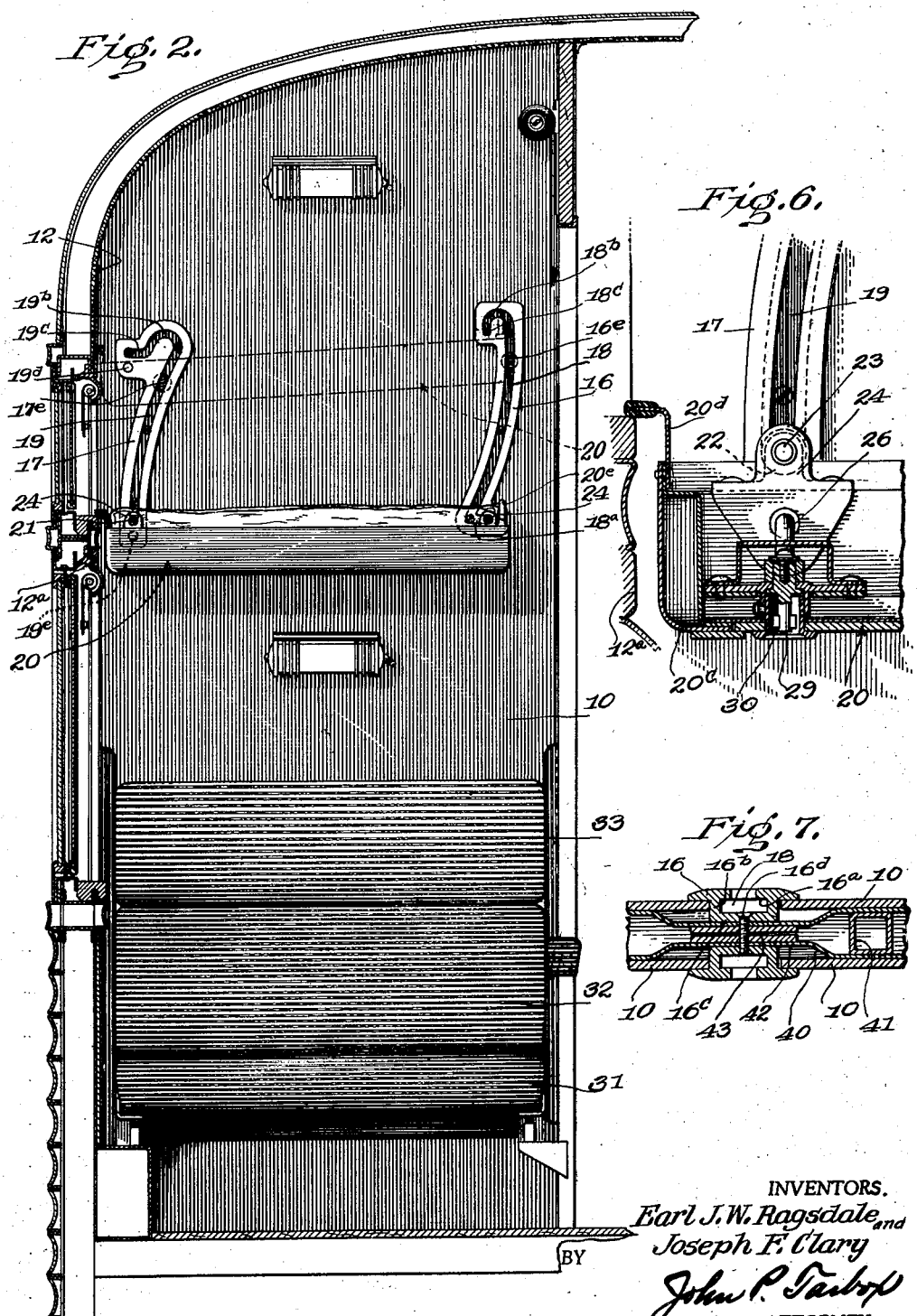

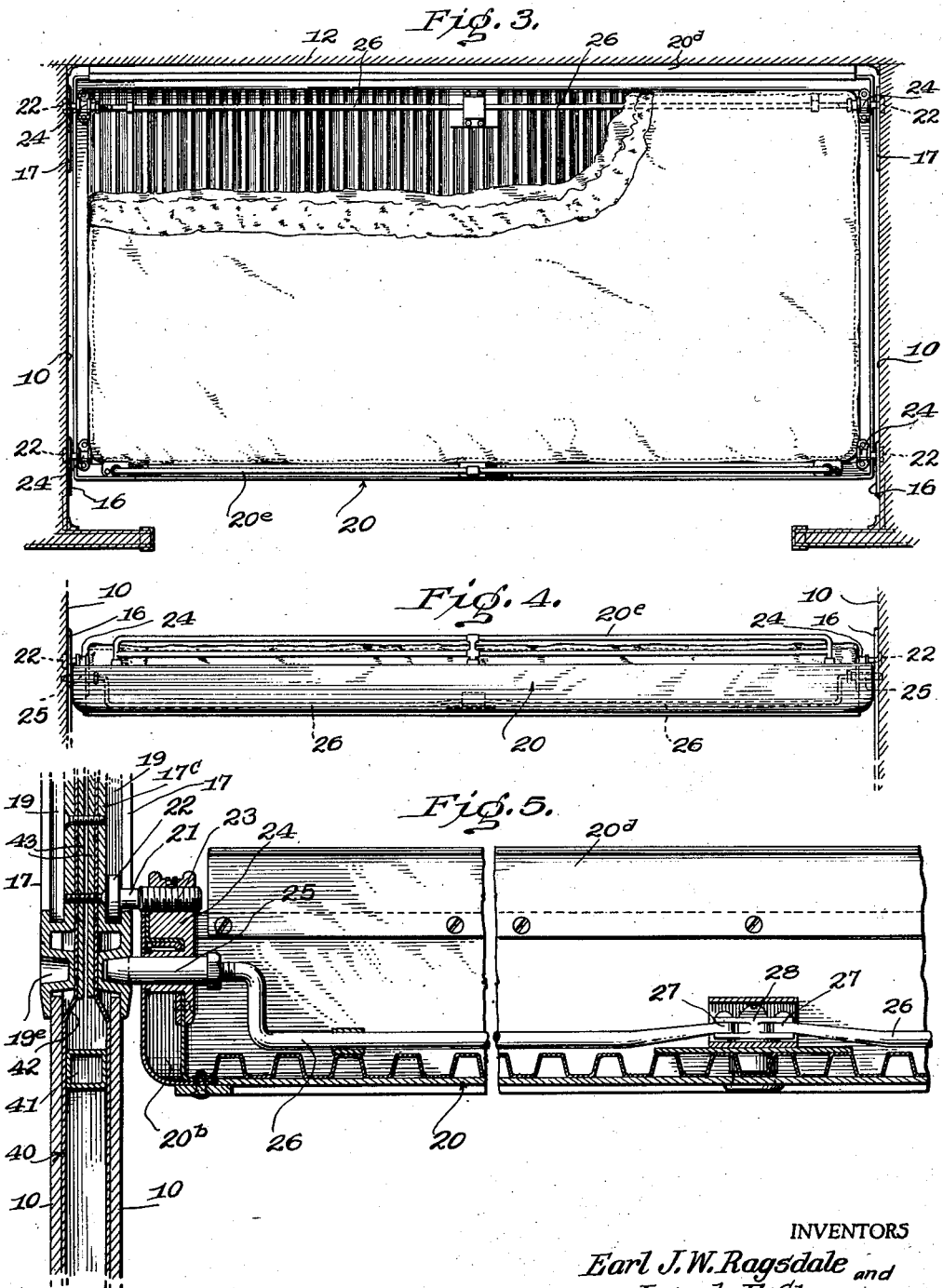

Patented Apr. 25, 1939

2,156,229

UNITED STATES PATENT OFFICE 2,156,229

SLEEPING CAR

Earl J. W. Ragsdale, Norristown, and Joseph F. Clary, Bala-Cynwyd, Pa., assignors to Edward G. Budd Manufacturing Company, Philadelphia, a corporation of Pennsylvania Application April 10, 1937, Serial No. 136,189

11 Claims. (Cl. 105—317)

This invention relates to sleeping car arrangements and more particularly to the construction of the upper berths adapted for use in such cars.

In the sleeping cars now in common use, the upper berth is pivoted at its wall edge to swing downward into a substantially horizontal position for use, and to swing upwardly into idle or stored position, in which latter position it is disposed at an angle or inclined to the horizontal.

One object of the present invention is to provide an upper berth which, when in idle or stored position, is substantially horizontal, and at a substantial height, such height being preferably sufficient to enable a passenger to stand erect.

Furthermore, in the present usual construction of sleeping cars, there are no windows above the level of the upper berth, whereby the occupant is deprived of light. Moreover, the usual windows associated with the lower berth do not extend up to the normal level of the eye of a person standing erect, but it is necessary for a passenger to either sit or stoop in order to look out through them.

Another object of the present invention is to provide a window structure so arranged that part of such structure extends above the upper berth when the same is in position for use so that the occupant of the upper berth may be able to look out through such window structure. Furthermore, when the berth is in its raised or idle position, the window structure below it extends to such height above the floor that a passenger may look out through the same while standing erect. Also, by virtue of the fact that my improved upper berth is substantially horizontal when in its raised or idle position, and is preferably disposed at such a height as to permit a passenger to stand upright beneath the same, the passenger may approach the window structure as closely as desired, while standing erect, and may look out through that portion of the window structure which is normally above the upper berth when the same is in position for use.

A further object of the invention is to provide improved means by which an upper berth may be adjusted to and securely locked in either one of two substantially horizontal positions, such means including specially designed wall brackets in which the berth is supported.

With the above and other objects in view, the invention consists in the construction and arrangement of parts hereinafter described and claimed, and illustrated in the accompanying drawings, in which:

Fig. 2 is a partial transverse vertical section showing the upper berth in lower position;

Fig. 3 is a horizontal section with parts broken away;

Fig. 4 is a longitudinal elevation of the upper berth with the adjacent walls in section;

Fig. 5 is a longitudinal vertical cross section through the berth and adjacent wall structure;

Fig. 6 is a transverse vertical section through the berth;

Fig. 7 is a horizontal section through the wall structure.

Figure 1:
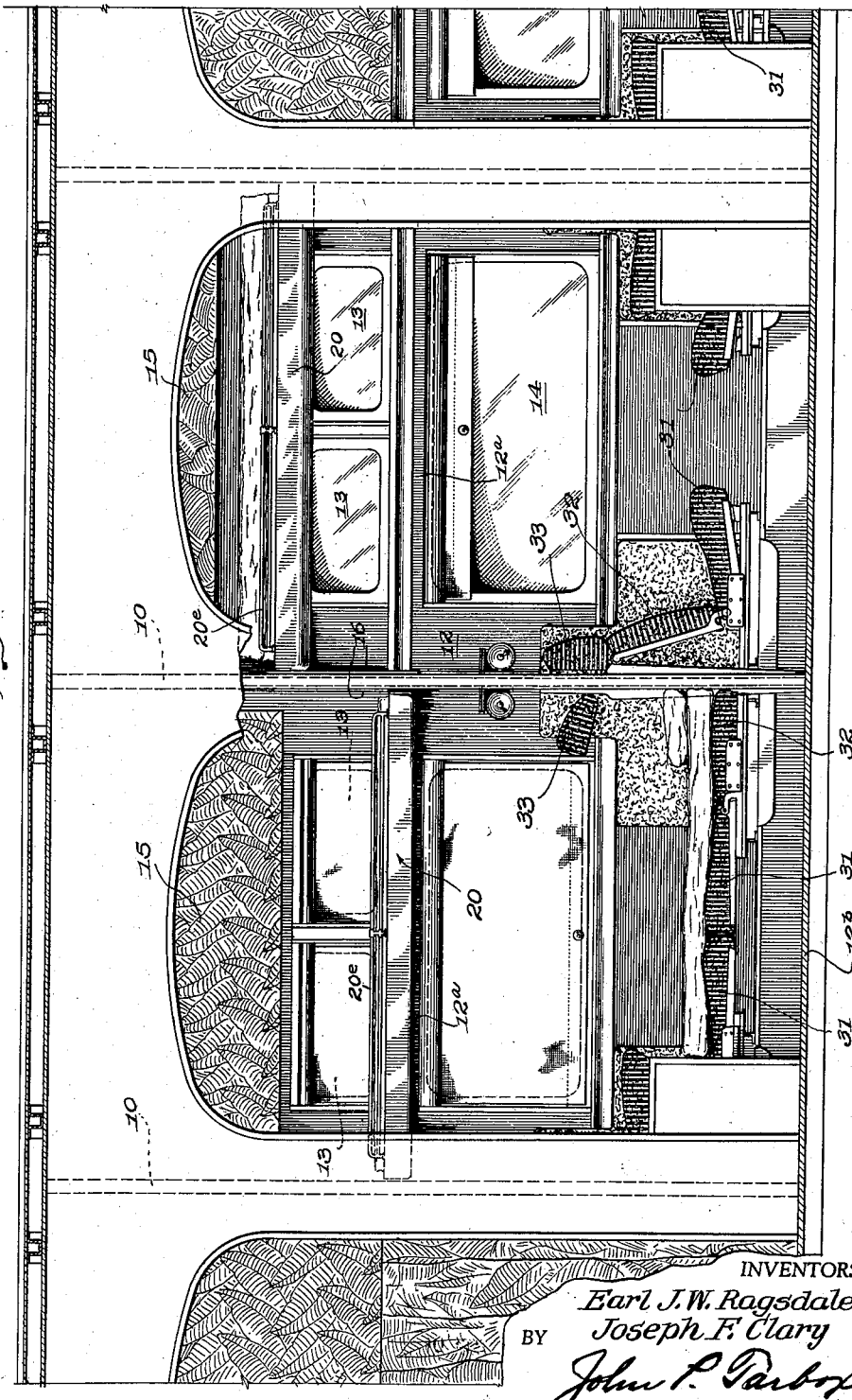
Fig. 1 is an elevation with parts broken away showing a series of sections with the berths in various made-up conditions.

Referring to the drawings in detail, 10 designates the usual partition wall between the sections of a sleeping car, and 12 the outer wall of the car, while 12b designates the floor.

The outer wall of the car is shown as provided with a window structure comprising an upper window 13 and a lower window 14, separated by a wall portion 12a. Shades or curtains 15, as shown in Fig. 1, may be of a suitable type and raised or lowered as desired.

Our improved supporting means for the upper berth comprises two pairs of wall brackets, one pair being mounted on each partition wall 10 at each end of the berth. One pair of such wall brackets is shown in Fig. 2 and the brackets are designated in their entirety by the reference numerals 16 and 17. They are secured to the partition wall 10 by means of screws passing through holes 16d formed in the bottom wall of the brackets as clearly shown in Fig. 7.

The bracket 16 has a slot 18 and the bracket 17 has a slot 19, each bracket adjacent these slots being formed as shown in Fig. 7. That is to say, the bracket 16, for example, has a bottom wall 16c and a pair of upstanding walls 16b, one at each side, the slot 18 being provided with marginal flanges 16a which overhang the space between the walls 16b. The bracket 17, throughout the major portion of the length of the slot 19, is similarly constructed.

The slot 18 in bracket 16 is of arcuate form throughout substantially its whole length, and is provided at the lower end of the bracket with a relatively short horizontal branch 18a, and at the upper end of the bracket with a sharply curved portion 18b terminating in a seat 18c.

Similarly the slot 19 in the bracket 17 is of arcuate form throughout substantially its whole length, and has a sharply curved portion 19b at its upper end, which merges into a short horizontal portion 19c. The arc on which the main body of the slot 18 is formed is struck about the upper curved end 19b of the slot 19, and the arc on which the slot 19 is formed is struck about the outer end of the branch 18a of the slot 18.

The berth itself is designated in its entirety by the numeral 20 and is preferably of relatively thin corrugated metallic framework to which a suitable sheathing may be secured. It carries at each side of each end a pin 21 having a flattened head 22, as shown in Fig. 5. This pin is illustrated as having a threaded portion 23 set into a block 24 carried by the frame of the berth 20. The berth is shown as comprising side and end frames 20ᵇ and 20ᶜ, of whole box section. (See Figs. 2 and 5). At the rear side of the berth is an upstanding panel or extension 20ᵈ having a cushioned edge adjacent the car wall. The berth is shown as provided at its front side with a suitable railing 20ᵉ.

The wall brackets 16 and 17 are provided with openings 16ᵉ and 17ᵉ through their rear walls, through which openings the head 22 of the pin 21 may be inserted, the pins then extending through the slots 18 or 19, and the head 22 working freely in the space between the walls 16ᵇ. The thickness of the head 22 is substantially less than the depth of the channel in the brackets, so that the head bears only against the inner surface 16ᵃ of the marginal edges of the slot and does not make contact with the inner surface 17ᶜ of the rear wall (see Fig. 5). Thus the paint or other finish applied to the inner surface 17ᶜ and visible through the slot 18 is not scraped or scratched by the head 22 of the pin, and thus the appearance of the brackets is not marred.

The wall structure as shown in Fig. 7 not only includes the external sheathing 10 which may be decorated in a suitable fashion, but such sheathing is supported by metallic framework 14 having suitable spacers 41 and having a restricted portion 42 to which the brackets 16 are secured. Suitable tapping blocks 43 are used to reinforce the relatively thin metallic sections.

In order to lock the berth securely in either of its positions, we provide locking bolts 25, mounted to slide through the blocks 24 at each end of the berth at the rear side thereof, these bolts being connected with pull rods 26 which extend to a point midway of the length of the berth and are there pivoted as at 27 to a rocking bracket 28 secured to a lugged stud 29 enclosed within a socket 30 opening through the bottom surface of the berth. By inserting a suitable key into the socket 30 over the stud 29 and turning it, it will be seen that the locking bolts 25 may be moved in or out.

Formed in each bracket 17 are a pair of tapered holes or sockets 19ᵈ and 19ᵉ (see Figs. 2 and 5), disposed near the upper and lower ends of the bracket respectively, and when the bolts 25 are projected outwardly, they are received in and enter these sockets, as clearly shown in Fig. 5.

Referring now particularly to Fig. 2, the method of manipulating the berth to move it from one position to another will now be described. In this figure the berth is shown in full lines in its lowermost or operative position, and it will be seen that in this position the pins 21 rest in the lower end of each slot, the pins at the inner or aisle side lying at the end of the horizontal branch 18ᵃ of the slots 18.

When it is desired to move the berth to its raised or idle position, the rear or wall edge is first swung upwardly into a sharp angular position, the pin 21 travelling up the arcuate slot 19, as the berth turns about the pin at the end of the slot 18ᵃ. When the upper end of the main portion of the slot 19 is reached, the berth is shifted toward the outer wall of the car, one pin moving from the end of the branch slot 18ᵃ to the bottom of the slot 18, and the other pin moving over the sharply curved portion 19ᵇ of the slot 19. The berth will come temporarily to rest in this position. The inner or aisle edge is then lifted, the pins at such edge moving upwardly in the arcuate slots 18 as the berth pivots about the pins resting in the curved portions 19ᵇ of the slots 19. The berth is moved in this way until it reaches a substantially horizontal position. Then by a further movement the pins on the wall edges slip outwardly to the ends of the horizontal branch slots 19ᶜ, as the pins at the aisle edge are moved around the curved portion 18ᵇ of the slots and dropped into the seats 18ᶜ thereof. This is the final position of the berth and is indicated in dotted lines.

Thus it will be seen that in shifting the berth from one position to another, it is swung first about one edge and then about the other, the complementary arcuate slots 18 and 19 permitting this movement. The final position of the berth may be described as substantially horizontal, but, as shown, it is not absolutely so, since it is illustrated as inclined slightly toward the outside of the car. This given an apparent headroom slightly greater than the actual headroom as it eliminates the foreshortened appearance.

It will further be observed that the aisle edge of the berth when in its operative position is locked against movement by the horizontal portions 18ᵃ of the slots, while the outer edge is locked by means of the bolts 25. In its raised or idle position the outer edge of the berth is also locked by the bolts 25, while the inner edge is held against accidental movement by the vertical portions 18ᶜ of the slots.

Referring to Fig. 1, the usual lower berth convertible seat is indicated at 31, 32, 33. Adjacent this seat is the usual window 14, and it will be observed that when the berth 20 is in its operative position, it is approximately on a level with the top of this window.

When, however, the berth is shifted to its raised or idle position, it lies at a point above the major portion of the upper window 13. Furthermore, the height of the berth from the floor, when in its idle position, as shown in Fig. 1, is preferably such that a passenger may stand upright beneath the same and may look out through the window 13. Also the passenger may walk freely between the seats 31 constituting the lower berth up to a point closely adjacent the windows.

Thus not only does the upper window 13 afford unobstructed vision to a passenger standing in the aisle or in the space between the seats 31 and beneath the upper berth 20, but it also serves to admit additional light into the lower berth space.

At the same time, when the berth 20 is in position for occupancy, the window 13 lies entirely above the same, thus affording light and vision to the occupant.

The berth 20, in its upper or idle position is especially suitable, during the idle period, for the temporary storage of coats, luggage, etc., and the curtain 15 may be closed to enhance the appearance of the car.

It is also to be understood that the upper berth 20 may be maintained in its upper, idle position, even when the lower is occupied if the passenger should desire the entire section. This eliminates the close cramped feeling of the lower berth.

While we have shown preferred forms of embodiment of our invention, we are aware that other modifications may be made thereto and we desire a broad interpretation of our invention within the scope and spirit of the disclosure herein and of the claims appended hereinafter.

What we claim is:

1. In a sleeping car of the class described, a sleeper section having a convertible lower berth construction and an upper berth including a tray-like member supporting bedding, supporting means extending from its respective end portions and fixed guides cooperating therewith, said upper berth being movable in said guides without reversing to different elevated substantially horizontal positions with the same side of the tray member uppermost.

2. In a sleeping car of the class described, a sleeper section having a convertible lower berth construction and an upper berth including a tray-like member suporting bedding, securing means extending from its respective end portions and fixed guides cooperating therewith, said upper berth being movable in said guides to different elevated substantially horizontal positions with the same side of the tray member uppermost, said berth in its uppermost position being accessible for the storage of luggage, etc.

3. In a sleeping car having a sleeping section, a plurality of vertically arranged berth constructions in said section and an upper window and a lower window having a horizontal wall portion between them at the outer wall of said section, the upper of said berth constructions being movable to a substantially horizontal elevated position above both of said windows but a substantial distance below the top of the section when not used as a bed, and being movable to a position substantially in alignment with the horizontal wall portion between the windows when in operative position for use as a bed.

4. In a sleeping car having a sleeper section, a plurality of vertically arranged berth constructions in said section and an upper window and a lower window having a horizontal wall portion between them at the outer wall of said section, the upper of said berth constructions being movable to a substantially horizontal elevated position above both of said windows but a substantial distance below the top of the section leaving a substantial space above it for storage when not used as a bed, and being movable to a position substantially in alignment with the horizontal wall portion between the windows, said berth construction having means projecting from the wall side thereof cooperating with the horizontal wall portion between the windows to substantially seal said berth construction with respect to said wall portion when in the lower operative position for use as a bed.

5. The combination with an adjustable berth, of a pair of supporting brackets at each thereof, each bracket of a pair having a substantially vertical arcuate slot, the center of curvature of each such slot lying at a point adjacent one end of the other, and pins carried by said berth and working in said slots, the upper end of each slot being sharply curved over to provide locking seats for said pins, said pins and slots being arranged to permit the movement of the berth while the pins are engaged with the slots from a lower operative position to an upper inoperative position without reversing the same.

6. The combination with an adjustable berth, of a pair of supporting brackets at each end thereof, each bracket of a pair having a substantially vertical arcuate slot, one such slot having a horizontal branch at its lower end, and the other such slot having a horizontal branch at its upper end, the center of curvature of one of said arcuate slots lying at the end of the horizontal branch of the other, and pins carried by said berth and working in said slots, said pins and slots being arranged to permit the movement of the berth while the pins are engaged with the slots from a lower operative position to an upper inoperative position without reversing the same.

7. The combination with an adjustable berth, of a pair of supporting brackets at each end thereof, each bracket of a pair having a substantially vertical arcuate slot, one such slot having a horizontal branch at its lower end, and the center of curvature of the other such slot lying at the end of said horizontal branch, and pins carried by said berth and working in said slots, said pins and slots being arranged to permit the movement of the berth while the pins are engaged with the slots from a lower operative position to an upper inoperative position without reversing the same.

8. The combination with a vertically adjustable berth movable from a lower operative position to an upper inoperative position and having a pair of pins projecting from each end thereof, a pair of brackets at each end having slots in which said pair of pins slide, said slots having end formations serving to hold the pins in either one of two positions to which they may be shifted and means in addition to said slots for positively locking said berth in either of its adjusted positions, said pins and slots being arranged to permit the movement of the berth to and from either of its positions without reversing it.

9. The combination with a vertically adjustable berth having a pair of pins projecting from each end thereof, a pair of brackets at each end having slots in which said pair of pins slide, and a pair of locking bolts projecting from opposite ends of said berth adjacent one side, one bracket of each pair having sockets adjacent the ends of said slots to receive said bolts, whereby said berth may be locked in either one of two positions, the pins and slots being arranged to permit the movement of the berth to and from said positions without reversing the same.

10. In combination with a plurality of walls, a berth supported therefrom, said berth having a plurality of projecting members and fixed guides on the walls cooperating therewith, said guides having limiting slots of hook shape to form fixed stops whereby said berth may be moved into and locked in either of two substantially horizontal elevated positions without reversing the same.

11. In a sleeping car of the class described, a sleeper section having a convertible lower berth construction and an upper berth including a frame supporting bedding, supporting means extending from the respective end portions of said berth and fixed guides cooperating therewith, said upper berth being movable in said guides without reversing to different elevated substantially horizontal positions with the same side uppermost.

EARL J. W. RAGSDALE.
JOSEPH F. CLARY.